(12) United States Patent
Knoppert et al.

(10) Patent No.: US 11,226,690 B2
(45) Date of Patent: Jan. 18, 2022

(54) SYSTEMS AND METHODS FOR GUIDING A USER WITH A HAPTIC MOUSE

(71) Applicant: Dell Products, L.P., Round Rock, TX (US)

(72) Inventors: Michiel Sebastiaan Emanuel Petrus Knoppert, Amsterdam (NL); Kyu Sang Park, Austin, TX (US); Frank Franciscus Maria Bertrand van Valkenhoef, 's-Hertogenbosch (NL)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/846,038

(22) Filed: Apr. 10, 2020

(65) Prior Publication Data
US 2021/0318764 A1 Oct. 14, 2021

(51) Int. Cl.
*G06F 3/0354* (2013.01)
*G06F 3/038* (2013.01)
*G06F 3/01* (2006.01)

(52) U.S. Cl.
CPC .......... *G06F 3/03543* (2013.01); *G06F 3/016* (2013.01); *G06F 3/038* (2013.01); *G06F 2203/014* (2013.01)

(58) Field of Classification Search
CPC ...... G06F 3/03543; G06F 3/016; G06F 3/038; G06F 2203/014
See application file for complete search history.

(56) References Cited

U.S. PATENT DOCUMENTS

| | | | | |
|---|---|---|---|---|
| 5,973,689 A * | 10/1999 | Gallery | .................. | G06F 3/016 715/859 |
| 6,211,861 B1 * | 4/2001 | Rosenberg | .............. | G06F 3/016 345/163 |
| 6,219,032 B1 * | 4/2001 | Rosenberg | .............. | A63F 13/06 345/157 |
| 6,285,351 B1 * | 9/2001 | Chang | .................... | G06F 3/011 345/156 |
| 6,697,043 B1 * | 2/2004 | Shahoian | ................ | A63F 13/06 345/156 |
| 6,724,400 B1 * | 4/2004 | Anderson | ............... | G06F 3/016 715/762 |
| 2005/0233287 A1 * | 10/2005 | Bulatov | ............... | G09B 21/006 434/114 |
| 2009/0282359 A1 * | 11/2009 | Saul | ........................ | G06F 9/452 715/784 |
| 2012/0124515 A1 * | 5/2012 | Li | ......................... | G06F 3/0482 715/808 |
| 2015/0026618 A1 * | 1/2015 | Stone | .................. | G06F 3/04815 715/769 |

(Continued)

*Primary Examiner* — Ariel A Balaoing
(74) *Attorney, Agent, or Firm* — Fogarty LLP

(57) ABSTRACT

Systems and methods for guiding a user with a haptic mouse are described. In an illustrative, non-limiting embodiment, an Information Handling System (IHS) may include a processor and a memory coupled to the processor, the memory having instructions stored thereon that, upon execution by the processor, cause the IHS to: detect a behavior of a pointer or cursor, where the pointer or cursor is controlled by a user via a peripheral device; and cause the peripheral device to provide a haptic response to the user, where the haptic response is selected to encourage, discourage, or highlight the behavior.

9 Claims, 14 Drawing Sheets

(56) References Cited

U.S. PATENT DOCUMENTS

2015/0082162 A1* 3/2015 Cho ................. G06F 3/0482
                                                    715/702
2017/0249024 A1* 8/2017 Jackson ............ G06F 3/038
2017/0357317 A1* 12/2017 Chaudhri .......... G06F 3/016

* cited by examiner

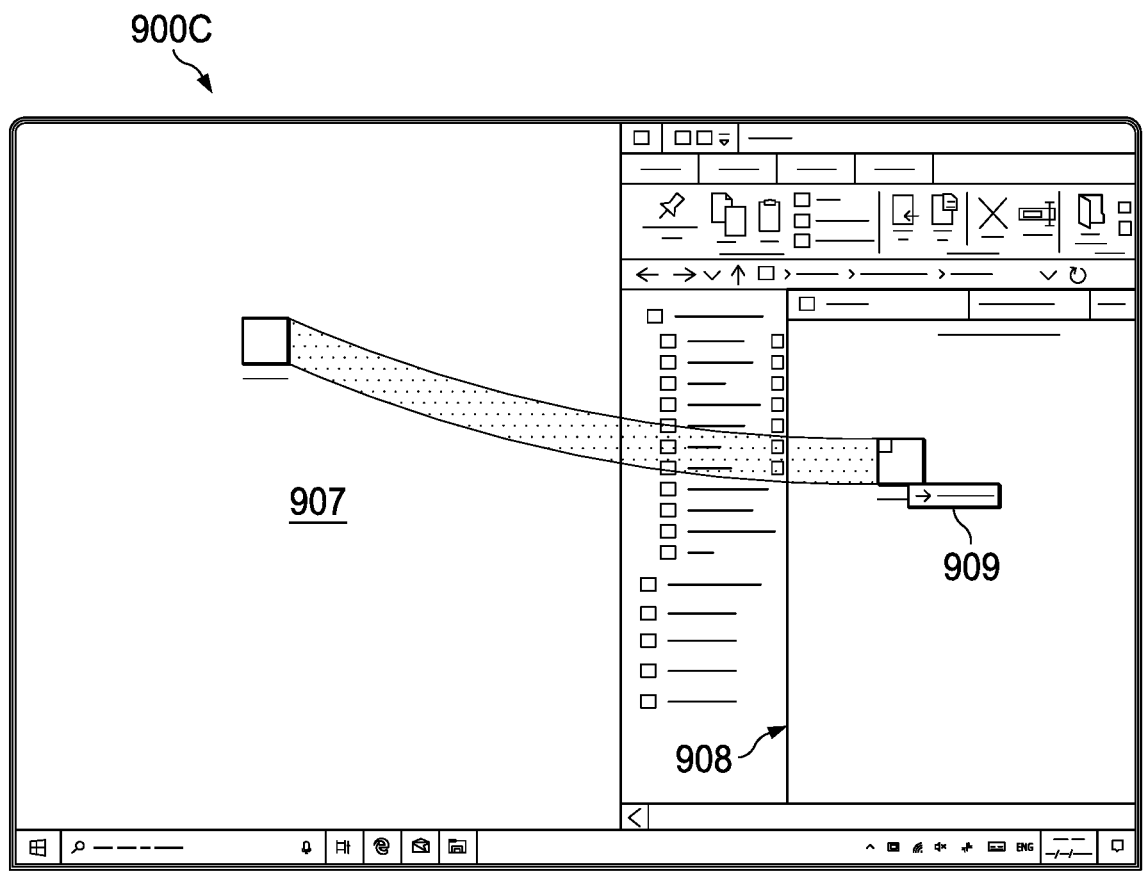
FIG. 9C
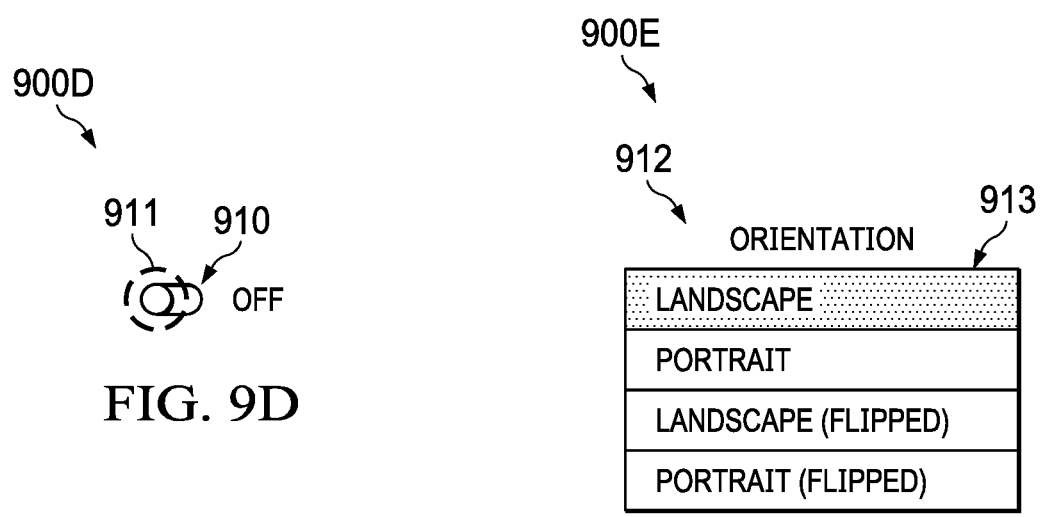
FIG. 9D
FIG. 9E

SYSTEMS AND METHODS FOR GUIDING A USER WITH A HAPTIC MOUSE

FIELD

This disclosure relates generally to Information Handling Systems (IHSs), and more specifically, to systems and methods for guiding a user with a haptic mouse.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A mouse is a hand-held peripheral device that detects two-dimensional motion relative to a surface (e.g., a table or desk). This motion is typically translated into the action of a pointer or cursor on an IHS's display, which allows a smooth control of the IHS's graphical user interface (GUI). The original mouse design used a ball rolling on a surface to detect motion, but modern designs use optical sensors and do not require moving parts. In addition to manipulating a cursor on a display, a mouse may also have buttons that enable specific operations (e.g., as selection of a menu item).

As the inventors hereof have recognized, although a traditional mouse provides visual feedback in the form of a pointer or cursor, it can be difficult for a user to locate the pointer on the screen, especially when using larger or multi-display setups. To address these, and other problems, systems and methods described herein may be used to guide a user with a haptic mouse.

SUMMARY

Embodiments of systems and methods for guiding a user with a haptic mouse are described. In an illustrative, non-limiting embodiment, an Information Handling System (IHS) may include a processor and a memory coupled to the processor, the memory having instructions stored thereon that, upon execution by the processor, cause the IHS to: detect a behavior of a pointer or cursor, where the pointer or cursor is controlled by a user via a peripheral device; and cause the peripheral device to provide a haptic response to the user, where the haptic response is selected to encourage, discourage, or highlight the behavior.

In some implementations, the peripheral device may include a mouse. Moreover, to provide the haptic response, the mouse may include at least one of: a friction feedback system, a vibro-tactile system, or a force feedback system.

In some cases, the behavior may include traveling in a direction of a boundary, and the haptic response may include increasing a friction, vibration, or force feedback of the peripheral device. Additionally, or alternatively, the behavior may include traveling in a direction of a boundary, and the haptic response may include decreasing a friction, vibration, or force feedback of the peripheral device. Additionally, or alternatively, the behavior may include traveling across a boundary, and the haptic response may include increasing a friction, vibration, or force feedback of the peripheral device.

For example, the boundary may include an application's graphical window or frame. Additionally, or alternatively, the boundary may include a boundary around a graphical button. Additionally, or alternatively, the boundary may include a boundary around graphical dial or slider. Additionally, or alternatively, the boundary may include a boundary around items of a graphical menu or list.

In some cases, the behavior may include traveling across a boundary, and the haptic response may include decreasing a friction, vibration, or force feedback of the peripheral device. Additionally, or alternatively, the behavior may include selecting a setting using a graphical user interface (GUI) feature, and the haptic response may include decreasing a friction, vibration, or force feedback of the peripheral device for a recommended setting. Additionally, or alternatively, the behavior may include selecting a setting using a graphical user interface (GUI) feature, and the haptic response may include increasing a friction, vibration, or force feedback of the peripheral device for a non-recommended setting. Additionally, or alternatively, the behavior may include reaching an edge of a display, and the haptic response may include increasing a friction, vibration, or force feedback of the peripheral device.

The instructions, upon execution by the processor, may cause the IHS to: in response to the user moving the pointer or cursor against the edge, display a menu associated with the edge; and decrease the friction, vibration, or force feedback of the peripheral device. The edge of the display may be disposed next to another edge of another display, and the instructions, upon execution by the processor, may cause the IHS to: in response to the user moving the pointer or cursor against the edge, render the pointer or cursor on the other display; and decrease the friction, vibration, or force feedback of the peripheral device.

In some cases, the behavior may include snapping two graphical user interface (GUI) elements together, and the haptic response may include increasing or decreasing a friction, vibration, or force feedback of the peripheral device to provide a magnetic effect. Additionally, or alternatively, the behavior may include dragging a graphical user interface (GUI) element, and wherein the haptic response comprises increasing or decreasing a friction, vibration, or force feedback of the peripheral device to indicate a drop area for the GUI element.

In another illustrative, non-limiting embodiment, a memory device may have instructions stored thereon that, upon execution by a process of an IHS, cause the IHS to: detect a behavior of a pointer or cursor, where the pointer or cursor is controlled by a user via a peripheral device; and cause the peripheral device to provide a haptic response to the user, where the haptic response is selected to encourage, discourage, or highlight the behavior.

In yet another illustrative, non-limiting embodiment, a method may include: detecting, by an IHS, a behavior of a pointer or cursor, where the pointer or cursor is controlled by a user via a peripheral device; and causing the peripheral device to provide a haptic response to the user, where the haptic response is selected to encourage, discourage, or highlight the behavior.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 9A-E are screenshots illustrating techniques for adding physical properties to Graphical User Interface (GUI) elements, according to some embodiments.

DETAILED DESCRIPTION

Systems and methods for guiding a user operating an Information Handling System (IHS) with a haptic mouse are described herein. In various embodiments, a haptic mouse may utilize different haptics systems, such as: a vibro-tactile haptics system, a friction-based haptics system, and/or a force feedback haptics system to provide the user with information about the IHS's Operating System (OS) or application, in addition to the visual feedback (e.g., rendering a pointer or cursor on a display).

The implementation of haptics into a mouse allows an IHS to communicate selected types of on-screen activities back to the user. As such, these techniques add an extra layer of feedback to the existing visual and audio layers. For example, systems and methods described herein may make it easier for users to keep track of their mouse by rendering boundaries on a display. Rendering the screen boundaries may in turn open the mouse to new interactions.

Figure 1:
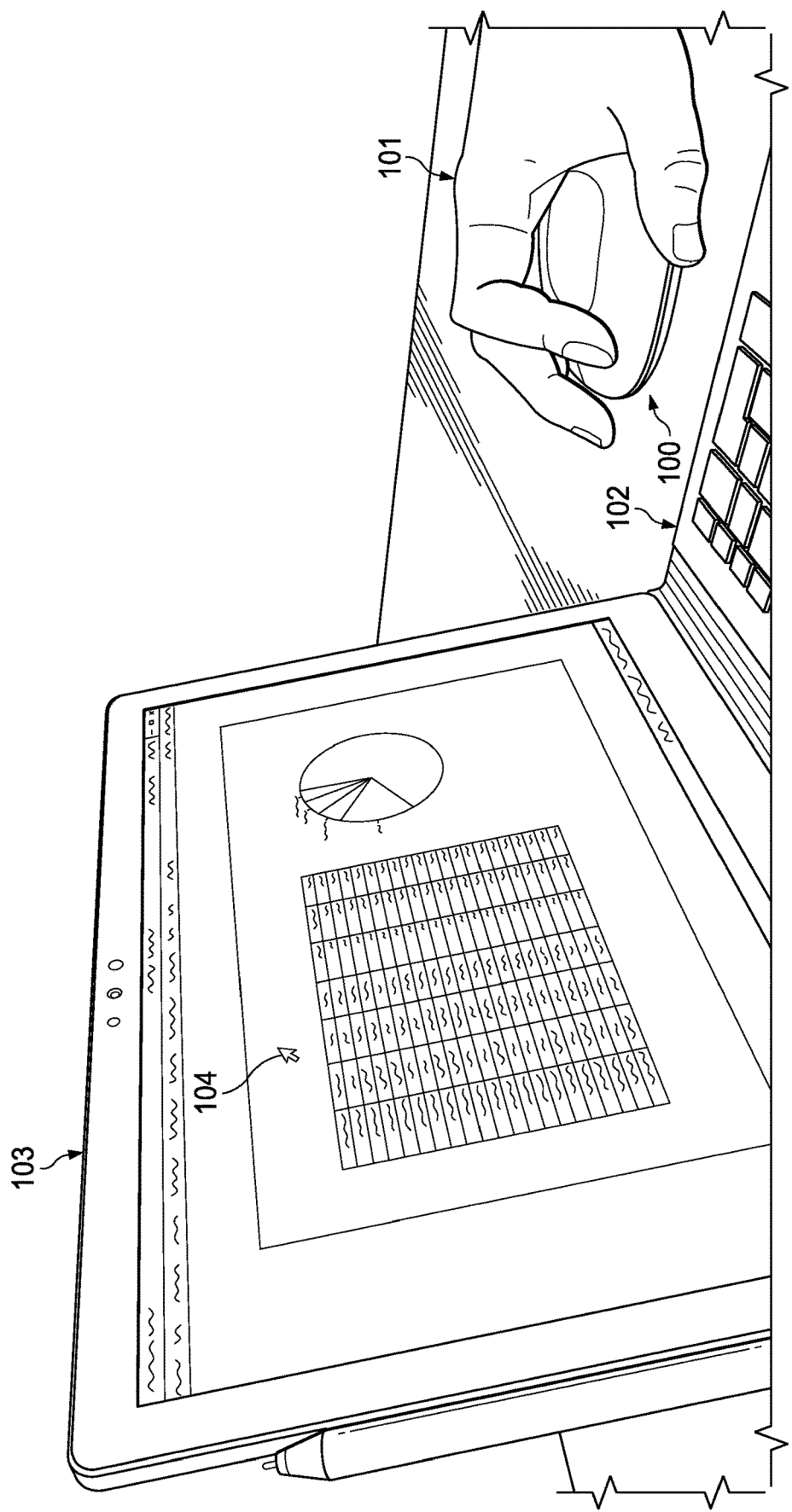
FIG. 1 is a perspective view of an example of a haptic mouse used with an Information Handling System (IHS), according to some embodiments.

FIG. 1 is a perspective view of an example of haptic mouse 100 used with IHS 202. As illustrated, user's hand 101 holds haptic mouse 100, typically on a flat surface next to IHS 102. Haptic mouse 100 may be in communication with IHS 102 via wired or wireless communication channels (e.g., Bluetooth, etc.). In operation, IHS 102 translates movement of haptic mouse 100 into a corresponding movement of pointer or cursor 104 on display 103. Moreover, IHS 102 detects or identifies a behavior of pointer or cursor 104 and, in response to the detection, causes haptic mouse 100 to provide a haptic response to user's hand 101. As described in more detail below, the haptic response may be configured to guide the user, for example, by encouraging, discouraging, and/or highlighting the behavior.

Although described as a haptic "mouse" 100 in FIG. 1, in other embodiments other types of peripheral devices may implement the systems and methods described herein (e.g., a haptic trackball, trackpad, etc.).

Figure 2:
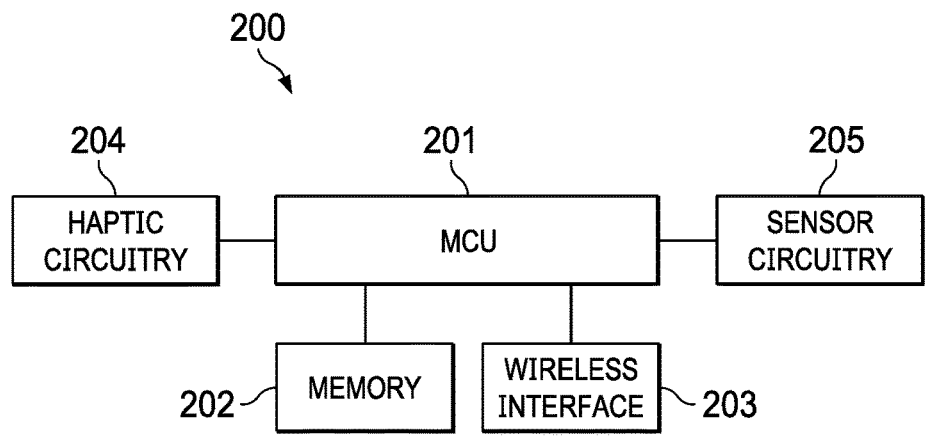
FIG. 2 is a block diagram of examples of internal components of a haptic mouse, according to some embodiments.

FIG. 2 is a block diagram of examples of internal components 200 of haptic mouse 100. In various embodiments, one or more of components 200 may be housed within a plastic casing or the like. As depicted, components 200 include processor or microcontroller unit (MCU) 201. MCU 201 is coupled to memory 202 having program instructions stored thereon that, upon execution by MCU 201, cause haptic mouse 100 to perform one or more of operations described herein.

MCU 201 is coupled to wireless interface 203 (e.g., RF circuitry and antenna) configured to implement BLUETOOTH, WiFi direct, or other suitable wireless communication protocol. MCU 201 is also coupled to haptic circuitry 204 and/or sensor(s) circuitry 205. In various implementations, elements or modules 202-205 may be coupled to MCU 201 using any suitable bus, interface, or the like.

Haptic circuitry 204 may include, for example, piezoelectric or ultrasonic elements. Meanwhile, sensor circuitry 205 may include elements configured to implement: electric, magnetic, hall effect, radio, optical, infrared, thermal, force, pressure, touch, capacitive, acoustic, ultrasonic, proximity, position, angle, turning, direction, movement, velocity, rotation, acceleration, gyroscopic sensors, etc.

In various embodiments, friction may be used as a haptic response. In other cases, however, vibro-tactile and/or force cues may also be provided. In general, any type of haptic feedback may be used, although some may be more suitable for specific situations. For example, one way to "render" the boundaries of a display might simulate the mouse "running into a wall" and being stopped due to an immediate increase in friction. Another way to "render" that same event and/or boundary may be as a "bump" that signals the edge of the display.

Figure 3:
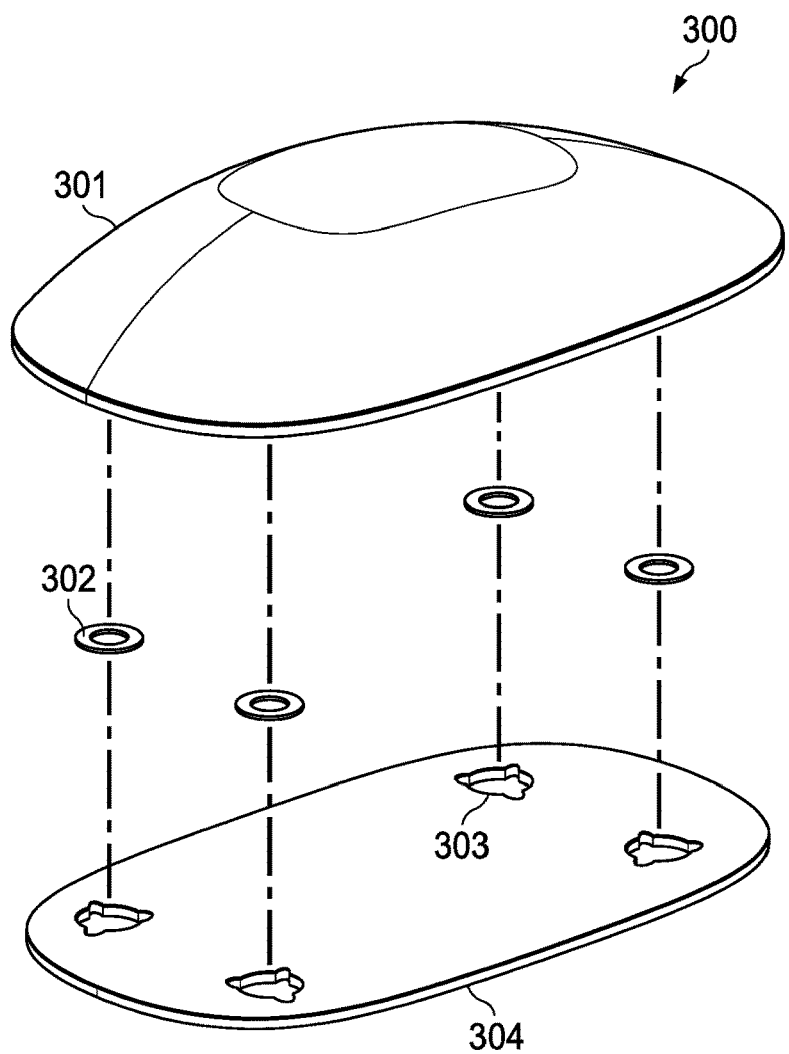
FIG. 3 is an exploded view of an example of a vibro-tactile haptics system, according to some embodiments.

FIG. 3 is an exploded view of an example of vibro-tactile haptics system 300. In some embodiments, system 300 may be implemented in haptic mouse 100 of FIG. 1. Vibro-tactile feedback may be created using Linear Resonant Actuators (LRAs) and/or Eccentric Rotating Mass (ERM) motors, however these elements do not typically provide very sharp/short feedback. Because a mouse can move rapidly, the haptics system should be responsive. To address this problem, in system 300, top surface 301 is suspended on top of piezoelectric transducers 302, which are hosted in cavities 303 in bottom surface 304.

The top surface 301 can move up and down by actuating all piezos 302 at the same time. Moreover, by actuating a single piezo element at a time, a button press operation can be replicated. In various embodiments, vibro-tactile feedback may be used, for example, to render textures and bumps.

FIG. 4A-E are exploded view of examples of friction haptics systems 400A-400E. In some embodiments, systems 400A-400E may be implemented in haptic mouse 100 of FIG. 1. Particularly, directional feedback may be created using passive (friction-based) haptics. By controlling the friction between haptic mouse 100 and its supporting surface, the drag can be increased making it harder to move haptic mouse 100 in a certain direction. In some cases, directional feedback may be used to render boundaries and/or direct a user's movement of haptic mouse 100.

Figure 4A:
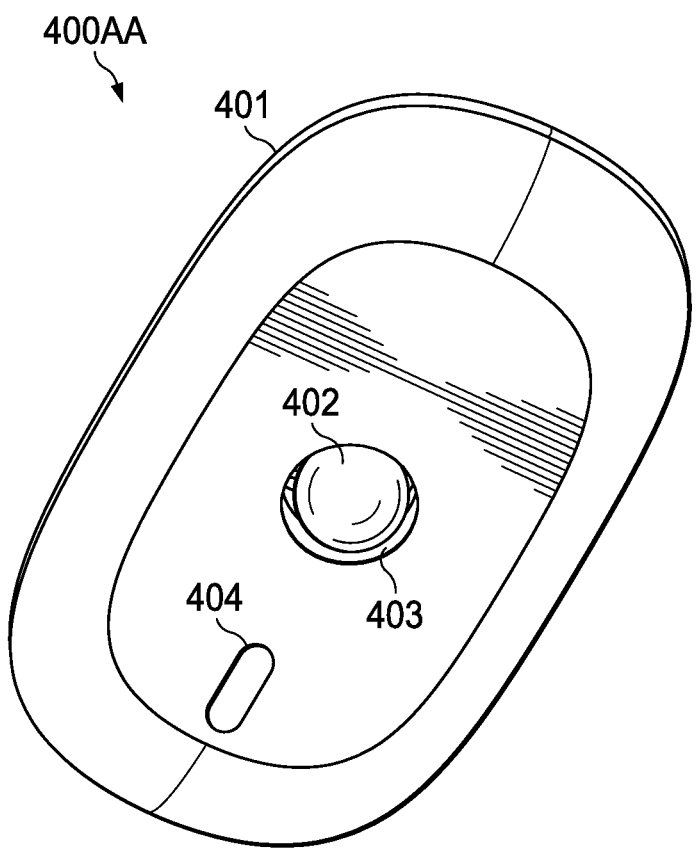
FIG. 4A-E are exploded view of examples of friction haptics systems, according to some embodiments.
Figure 4A:
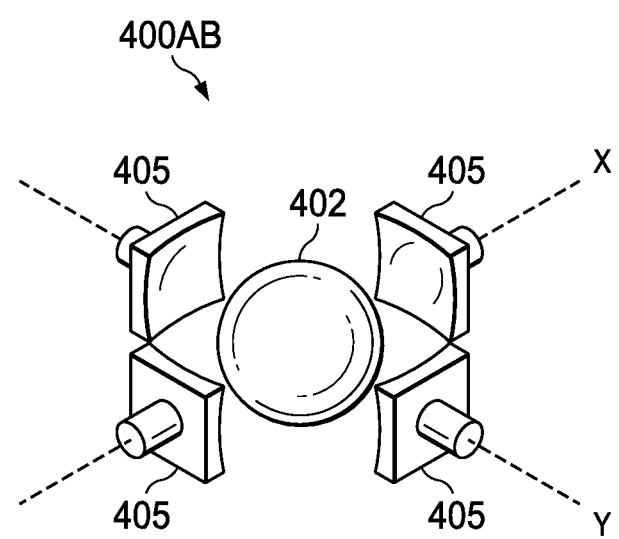

In system 400AA-AB of FIGS. 4AA and 4AB, haptic mouse 401 includes brake ball 402 in cavity 403, distinct from optical mouse sensor 404. In operation, brake ball 402 touches the horizontal surface. Moreover, brake ball 402 is flanked on four sides by brake pads 405, two on the x-axis and two on the y-axis. As such, system 400AA-AB enables haptic mouse 401 to selectively break any movement perpendicular to the axis and thus control the friction experienced by the user in any selected direction.

Figure 4C:
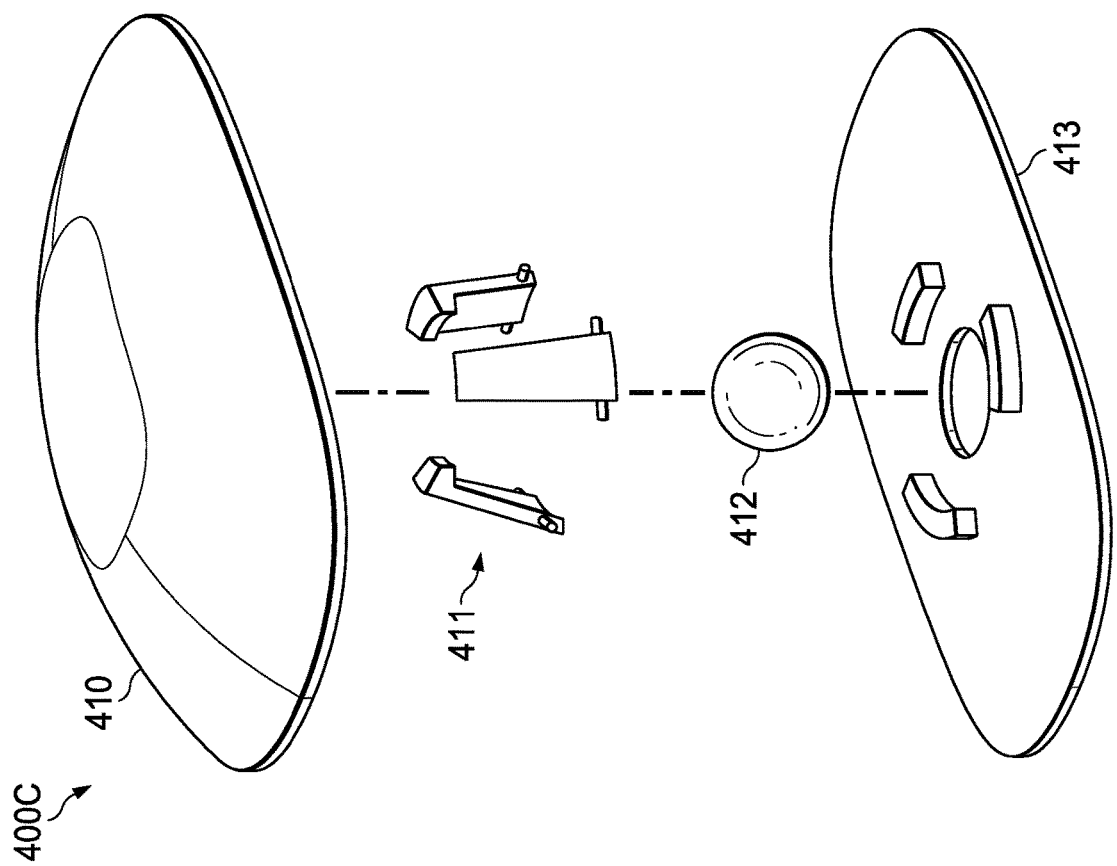
Figure 4B:
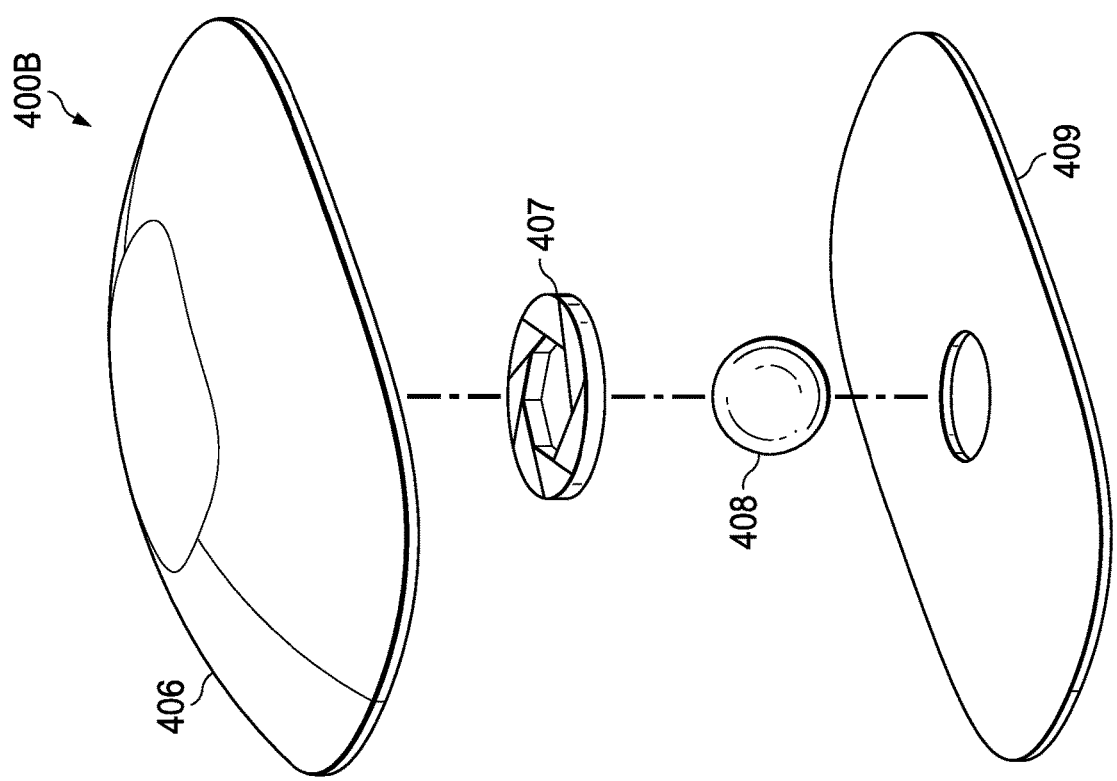

In system 400B of FIG. 4B, a haptic mouse includes top surface 406, diaphragm brake 407, brake ball 408, and bottom surface 409. Diaphragm brake 407 can be used to increase the friction of the mouse in any direction. Brake ball 408 extrudes the bottom of the mouse and touches the horizontal surface. Diaphragm 407 may have with bendable blades such that, by selectively opening and closing diaphragm 407, friction can be controlled in any selected direction.

In system 400C of FIG. 4C, a haptic mouse includes top surface 410, three-point brake 411, brake ball 412, and bottom surface 413. Three-point brake 411 surrounds ball 412 and includes three levers. By selectively opening and closing each lever, friction can be controlled in any selected direction.

Figure 4E:
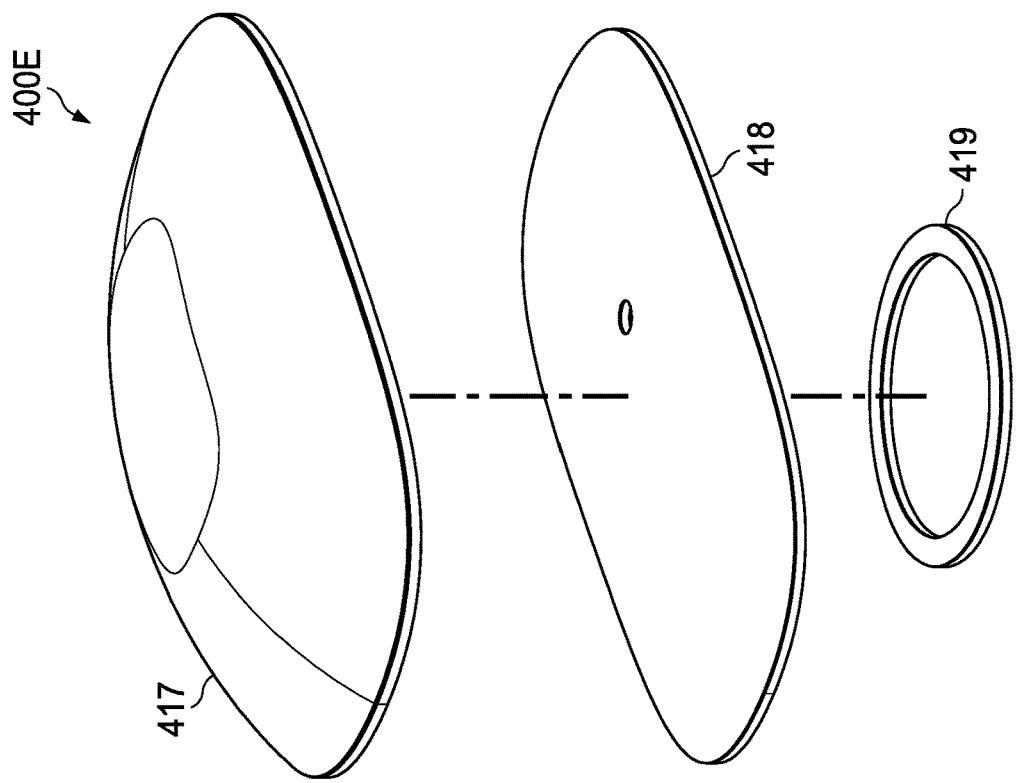
Figure 4D:
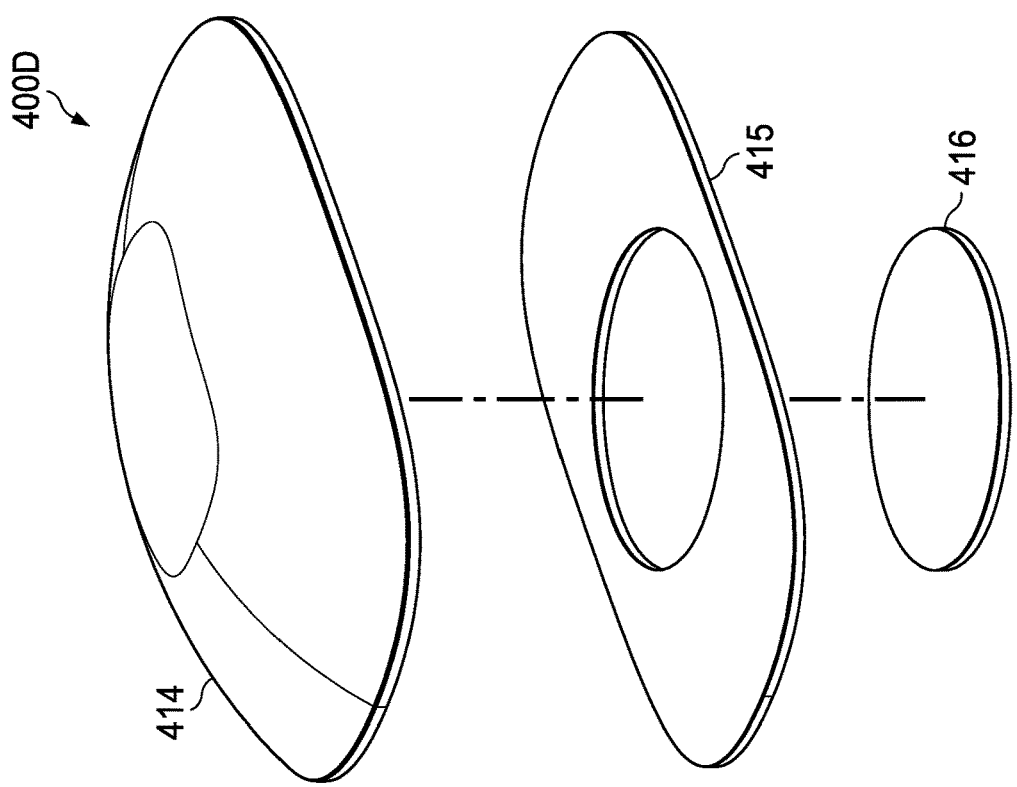

In system 400D of FIG. 4D, a haptic mouse includes top surface 414, bottom surface 415, and circular brake pad 416. Brake pad 416 pushed onto the horizontal surface applies friction with uniform magnitude in every direction and therefore changes the overall friction experienced by the user. By selectively moving the pad up and down, friction can be controlled in any selected direction.

In system 400E of FIG. 4E, a haptic mouse includes top surface 417, bottom surface 418, and inflatable brake pad 419. When inflatable brake pad 419 is pushed onto the horizontal surface, it applies friction with uniform magnitude in every direction. By selectively filling and emptying brake pad 419, friction can be controlled in any selected direction.

Figure 5B:
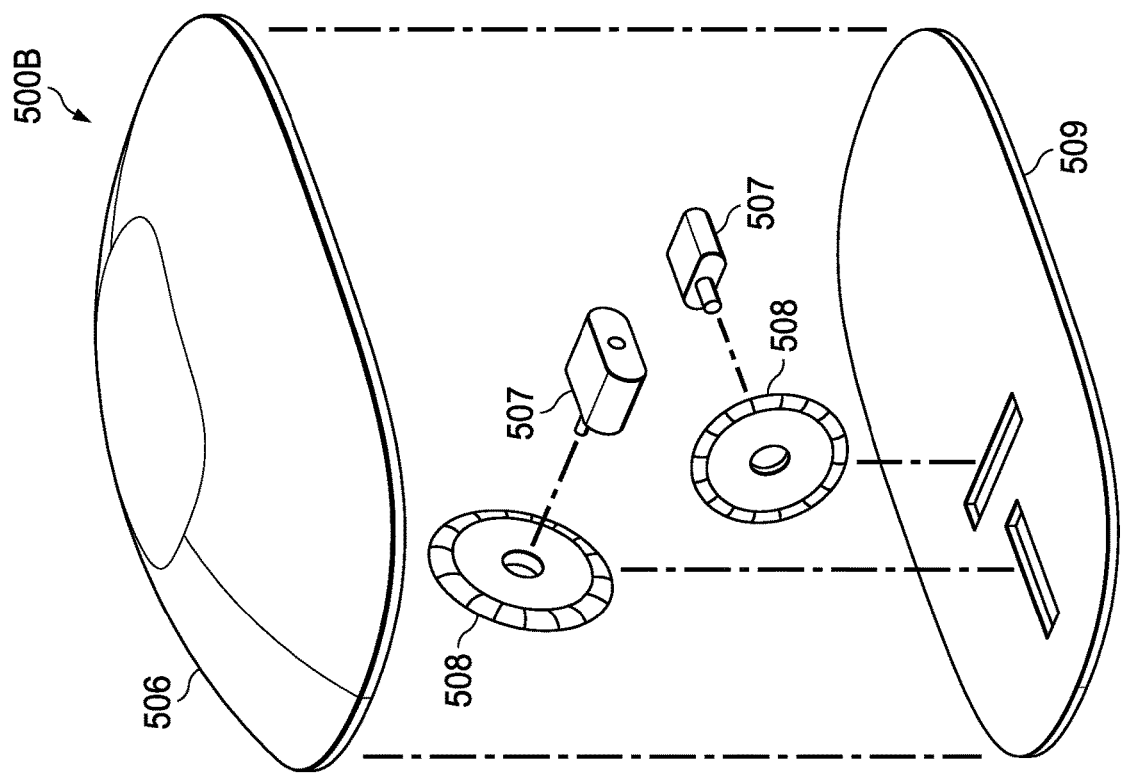
FIG. 5A-C are exploded views of examples of force haptics systems, according to some embodiments
Figure 5A:
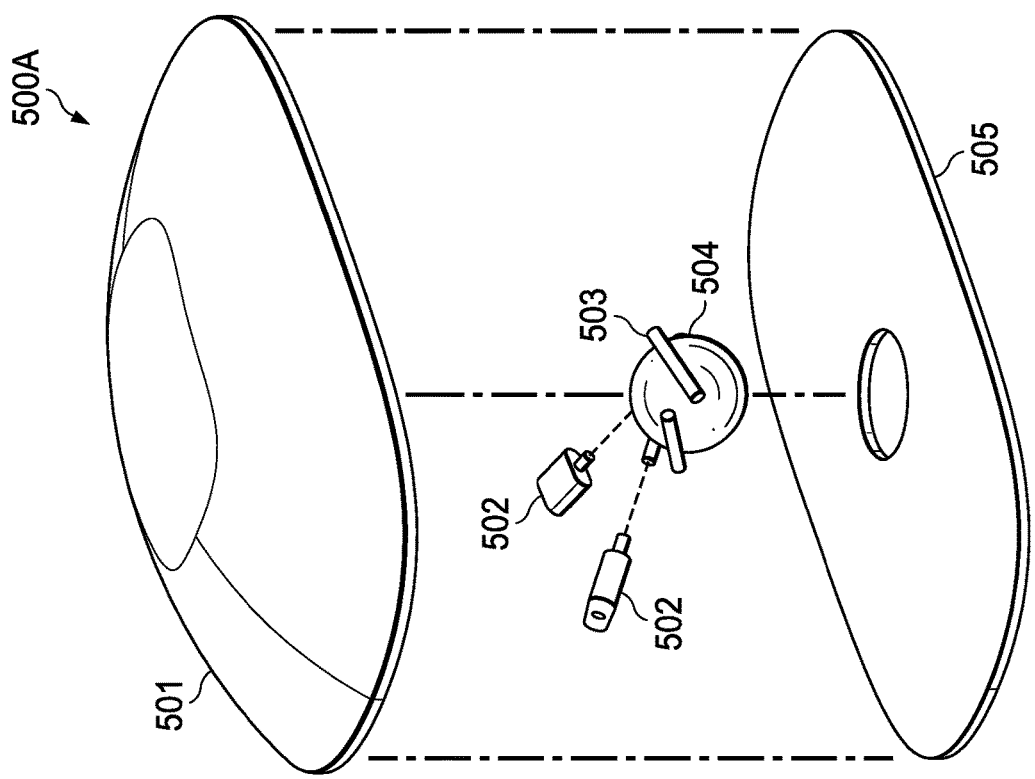
Figure 5C:
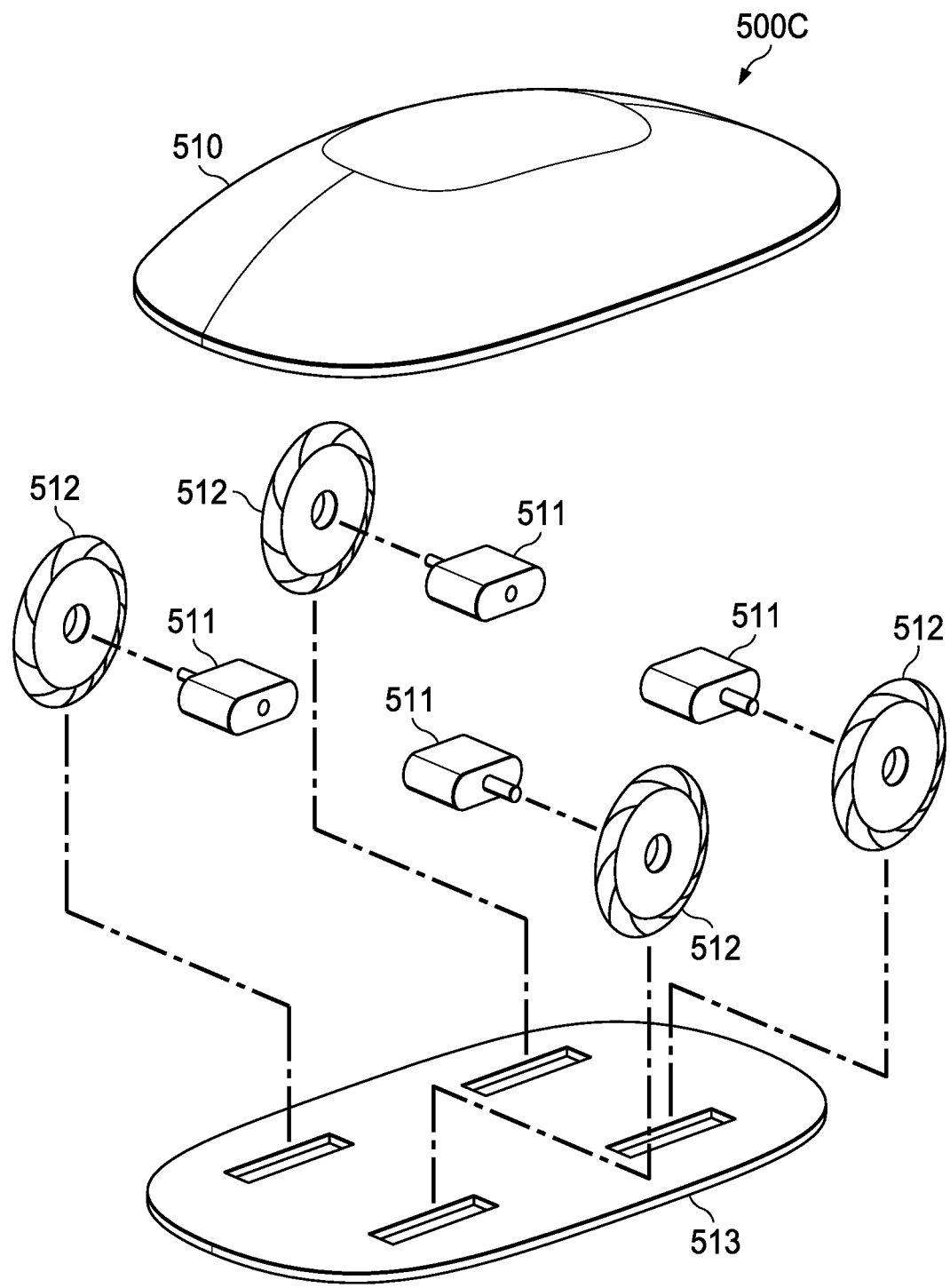

FIG. 5A-C are exploded views of examples of force haptics systems 500A-C.

In some embodiments, directional feedback may be created using active (force feedback) haptics. With active haptics, the drag can be increased but also decreased by exerting a force on the mouse in any direction. Moreover, directional feedback can be used to render boundaries and direct a user.

Particularly, in system 500A of FIG. 5A, a haptic mouse includes top surface 501, brake ball 503, rollers 504 (e.g., four), motors 502 (e.g., two, one for x axis and one for y axis), and bottom surface 505. Brake ball 503 is encapsulated by rollers 504, and rollers 504 may be driven by motors 502. By controlling motors 502, the mouse can move in any direction, brake in any direction, and/or provide force feedback in any direction.

In system 500B of FIG. 5B, a haptic mouse includes top surface 506, a pair of motors 507, a pair of omni wheels 508, and bottom surface 509 having rectangular openings that allow wheels 508 to touch the horizontal surface. Omni wheels 508 may be driven in one axis and run free in the perpendicular axis, for example. As such, wheels 508 can drive both the X and Y axis allowing the mouse to be moved in any direction and/or provide force feedback in any direction.

In system 500C of FIG. 5C, a haptic mouse includes top surface 510, four motors 511, four mecanum wheels 512, and bottom surface 513 having rectangular openings that allow wheels 512 to touch the horizontal surface. Mecanum wheels are designed to move the mouse in any direction and/or to instantaneously provide force feedback in any direction.

Figure 6:
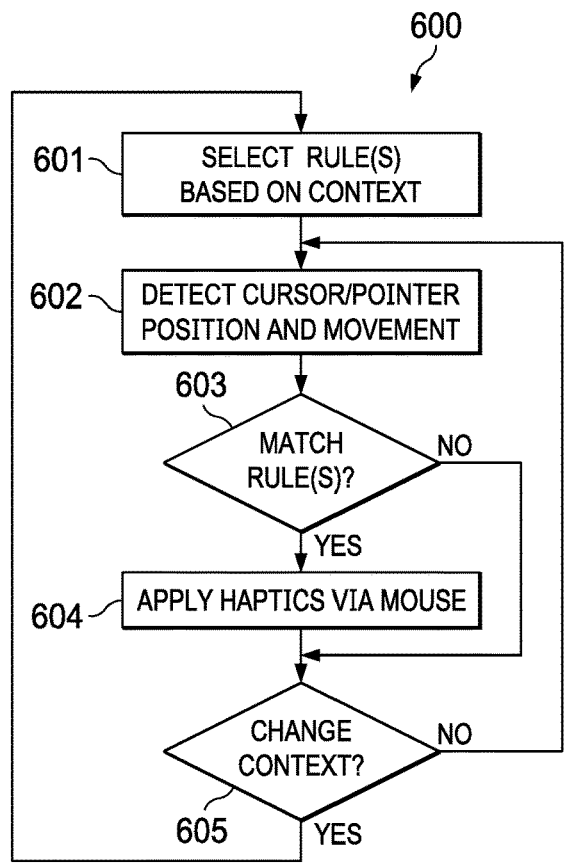
FIG. 6 is a flowchart of an example of a method for guiding a user with a haptic mouse, according to some embodiments.

FIG. 6 is a flowchart of an example of method 600 for guiding a user with a haptic mouse. In some embodiments, method 600 may be performed by IHS 102 executing program instructions and using haptic mouse 100 to provide haptic responses or feedback to user 101. For example, method 600 may be used to detect a behavior of a pointer or cursor (e.g., movement towards a preset boundary, display edge, Graphical User Interface or "GUI" element or feature, etc.) and/or to cause the haptic mouse to provide a haptic response to the user that encourages, discourages, or highlights the behavior.

At block 601, method 600 selects one or more haptics rules based on a current context of IHS 102. Each haptic rule may set a condition in response to which a corresponding haptic feedback (e.g., increase or decrease friction, increase or decrease force, etc.) is provided to the user. Examples of conditions include, but are not limited to, a pointer or cursor controlled by the haptic mouse approaching, reaching, and/or crossing a preset boundary on a screen, an edge of a display, a GUI feature or element, etc.

As such, these haptic rules may be used to guide a user, to render screen boundaries, to render screen elements, and/or to add physical properties to GUI elements. In some cases, haptic rules may be selected and/or enforced at block 601 depending upon contextual information such as, for example, the application(s) being executed or rendered, the posture of IHS 102, a distance between the user and IHS 102, a current battery charge level of the haptic mouse, etc.

At block 602, method 600 detects a pointer or cursor's position and/or movement (e.g., speed, direction, acceleration) indicative of a behavior. At block 603, method 600 determines whether the behavior matches the applicable haptics rule. If so, IHS 102 instructs haptic mouse 100 to provide a corresponding haptic response to the user, as prescribed by the haptics rule. Otherwise, block 605 determines whether the present context has changed. If so, control returns to block 601. If not, control returns to block 602.

Figure 7A:
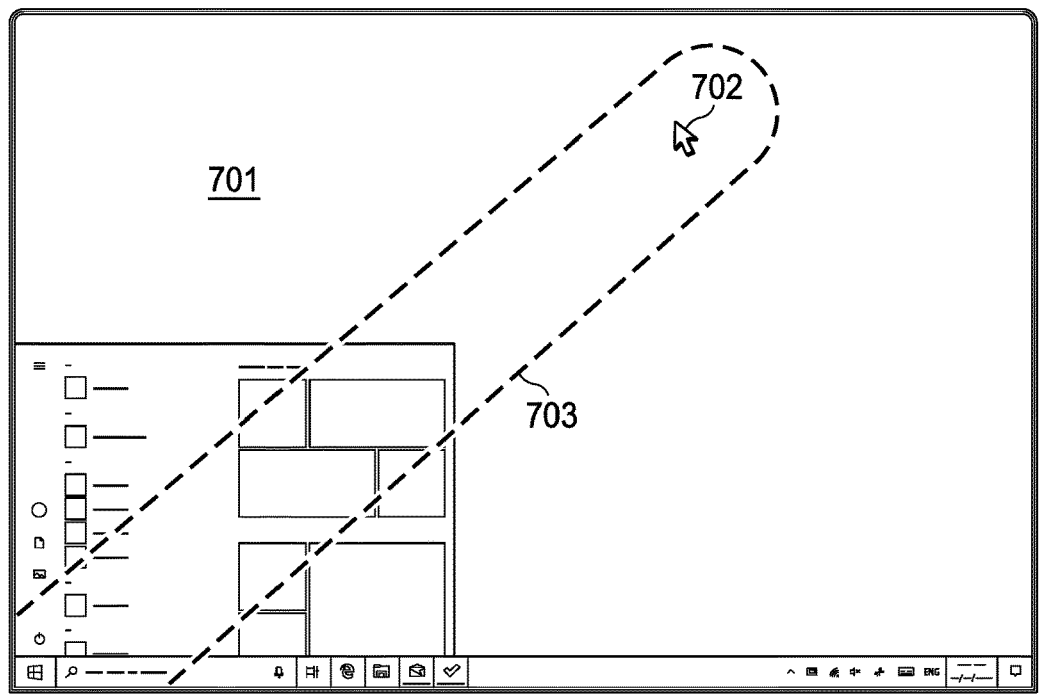
FIGS. 7A-C are screenshots illustrating techniques for guiding a user with a haptic mouse, according to some embodiments.
Figure 7B:
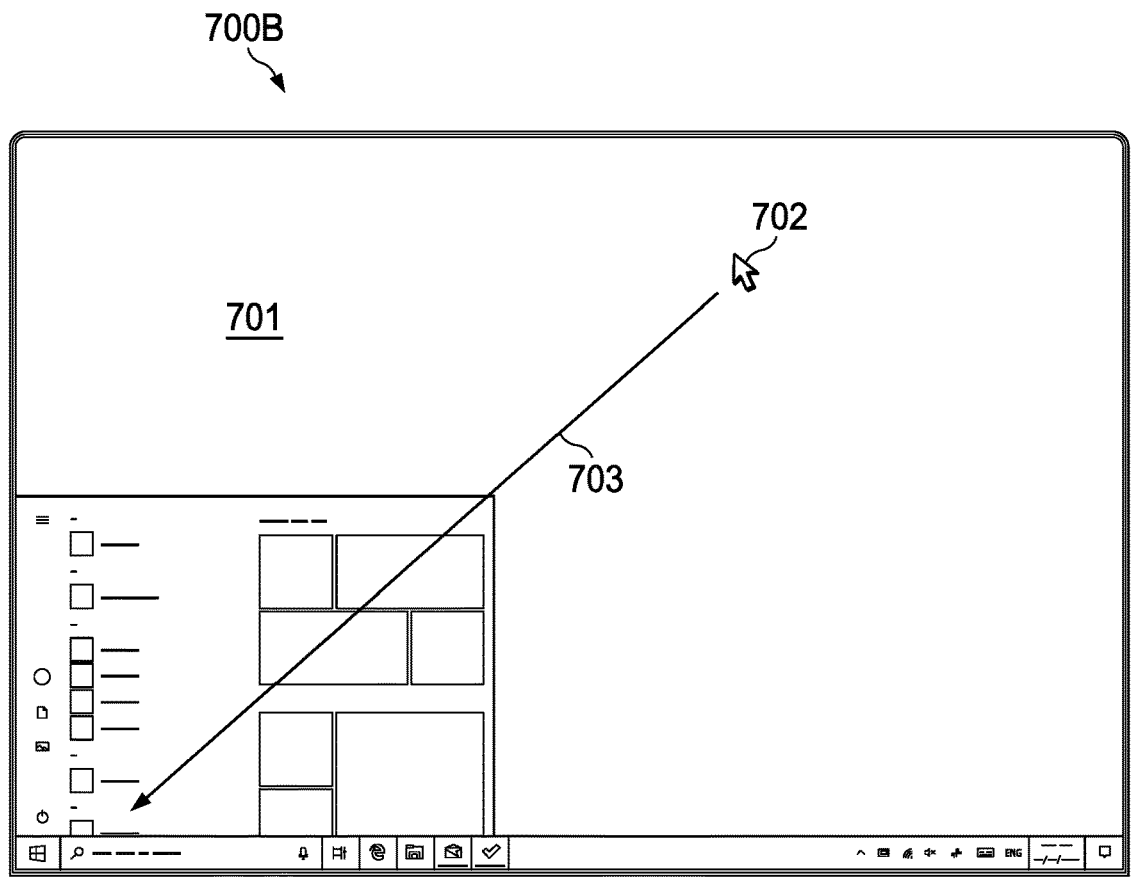
Figure 7C:
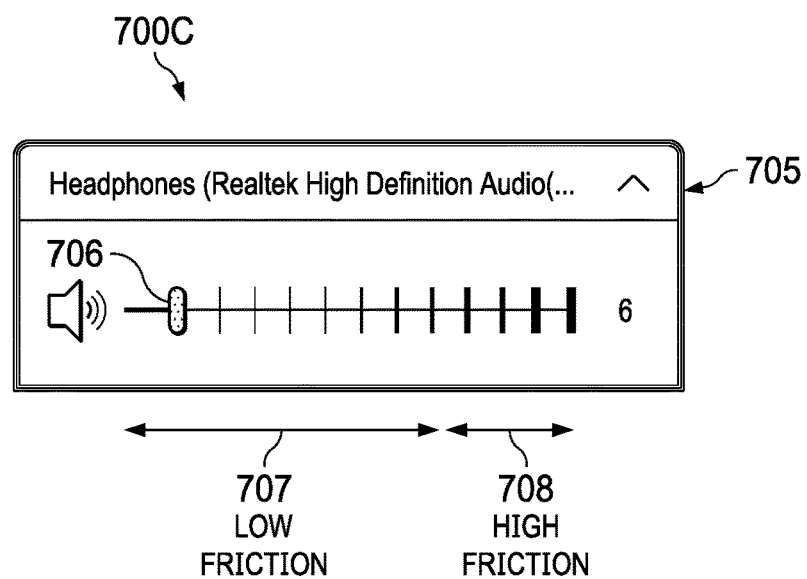

FIGS. 7A-C are screenshots illustrating techniques for guiding a user with a haptic mouse. In various embodiments, techniques 700A-C may be implemented in connection with the execution of method 600 of FIG. 6 depending upon the haptic rule(s) in effect. For example, by increasing the friction going the wrong direction and reducing the friction in the right direction, users can be guided to discover new features or understand how to perform certain operations.

In technique 700A, boundary 703 (e.g., set with pixel coordinates and of any suitable shape and size) with respect to screen, display, desktop, or application 701 helps a user maintain pointer 702 in (or away from) a selected area of screen 701.

In technique 700B, an active haptic feedback system may be provided so that a remote or digital coach/trainer can direct the user's hand, which in turn moves pointer 702 on screen, display, desktop, or application 701 in direction 703 (e.g., towards a GUI feature or the like).

In technique 700C, haptic responses may be used to allow the user to feel recommended settings through friction and/or force. In menu 705 with slider control 706, selection of a recommended setting 707 (e.g., speaker output volume)

may be accompanied by low-friction (or no-friction) haptic feedback, whereas selection of a non-recommended setting 708 may be accompanied by high-friction haptic feedback. As such, technique 700C may be used to make it more difficult for a user to select non-recommended settings (e.g., volume too loud) by accident. In another example, a photography application may suggest a cropping size for a given image, and technique 700C may be used to make it harder for a user to choose a bad cropping. With friction and force haptics, it is possible to render suggested settings, keep-out zones, equilibrium settings, and/or elasticity.

FIGS. 8A-D are screenshots illustrating techniques 800A-D for rendering screen boundaries. In various embodiments, techniques 800A-D may be implemented in connection with the execution of method 600 of FIG. 6 depending upon the haptic rule(s) in effect.

Figure 8A:
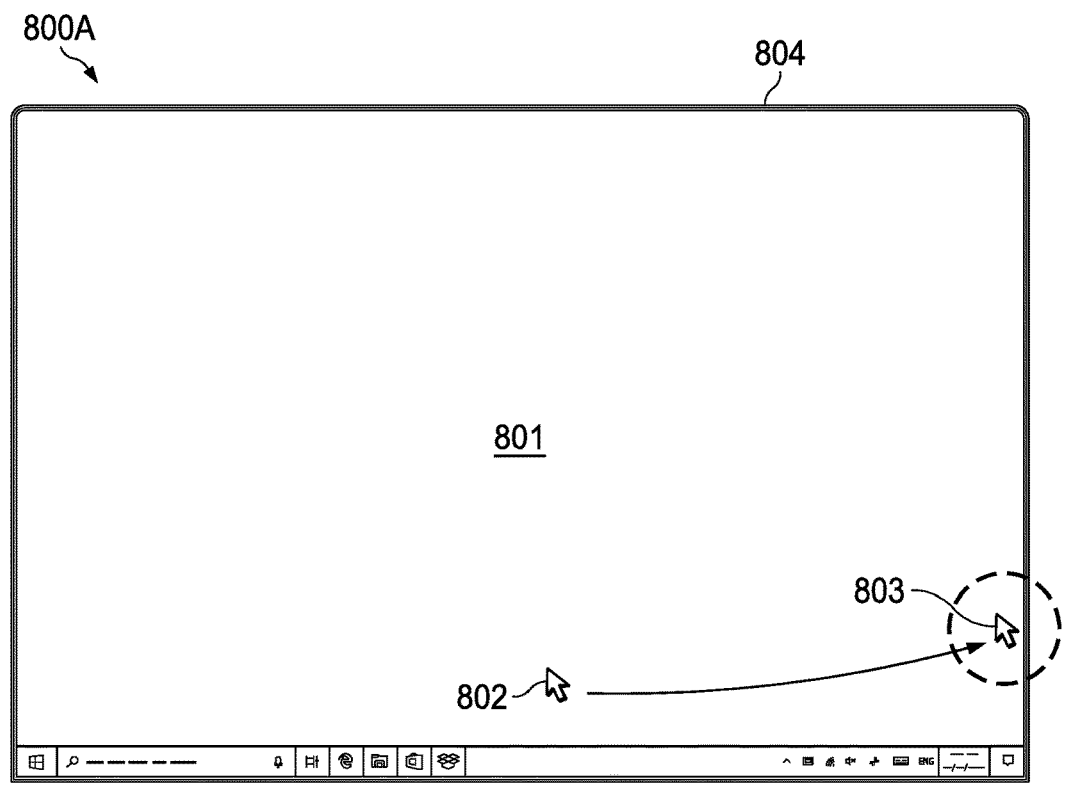
FIGS. 8A-D are screenshots illustrating techniques for rendering screen boundaries, according to some embodiments.

With respect to technique 800A of FIG. 8A, in many cases, users often lose sight of their pointer or cursor 802 as it moves off-screen 803, or due to the fact the contrast with the background is too low. To retrieve the pointer or cursor, users move their mice around wildly hoping their eyes will pick up its movement. During this movement, the pointer or cursor often reaches the edges of screen 801. By rendering a haptic bump 804 with active haptic feedback or an area with resistance with passive haptic feedback at the edges of screen 801, users can become aware of the pointer or cursor's position much easier. For example, the user can simply move pointer or cursor 802 in one direction until they feel screen edge 804 or move diagonally until they feel the cursor has reached the corner of screen 801.

Figure 8B:
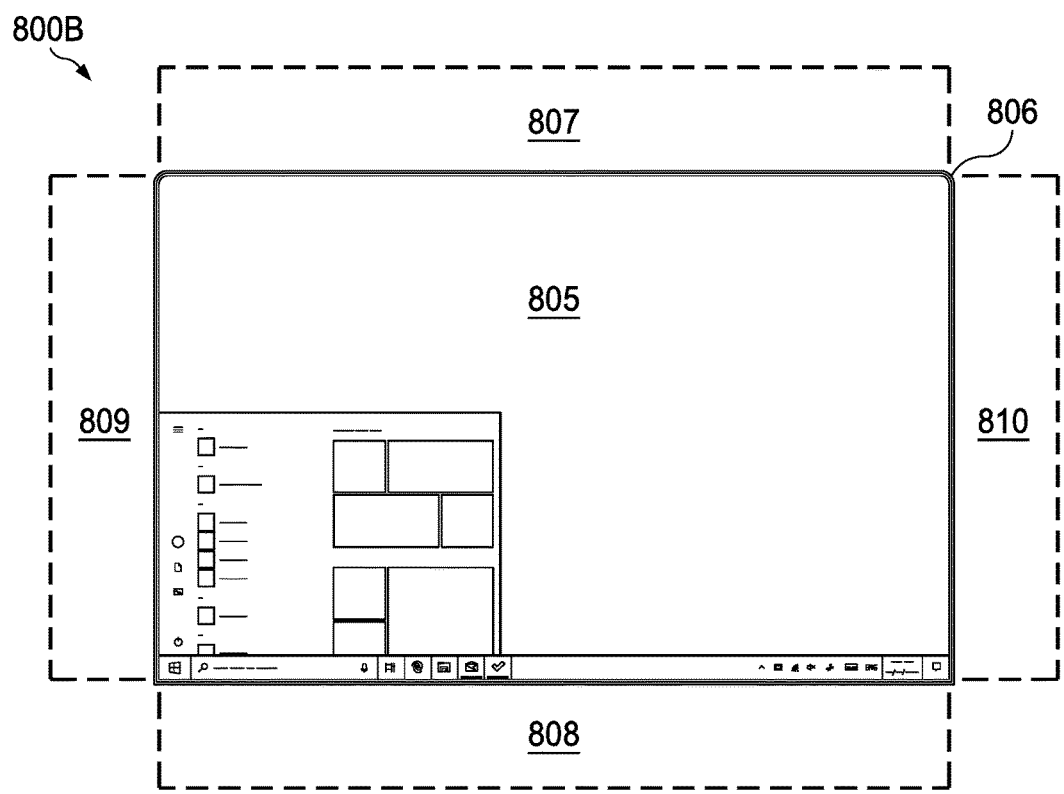

In technique 800B of FIG. 8B, edge actions are provided. For example, swiping toward the top portion of display 805 beyond haptic boundary 806 can invoke menu (e.g., a share menu) or command 807, swiping toward the bottom portion of display 805 beyond haptic boundary 806 can invoke menu (e.g., a start menu) or command 808, swiping toward the left portion of display 805 beyond haptic boundary 806 can invoke menu (e.g., task view) or command 809, and swiping toward the right portion of display 805 beyond haptic boundary 806 can invoke menu (e.g., a notification area) or command 810.

A haptic mouse implementing these techniques can render screen boundaries. When using force feedback, these boundaries can feel like a small bump, such that moving over it may feel like pushing a ball over a hump. When using friction feedback, these boundaries may feel like a strip of higher-friction material, indicating the end of the workable area whilst allowing the behavior to continue. By passing through such a boundary, a user can trigger an edge action. In different implementations, these edge actions may be preset, may vary per application, may be user customizable, and/or may be contextual.

Figure 8C:
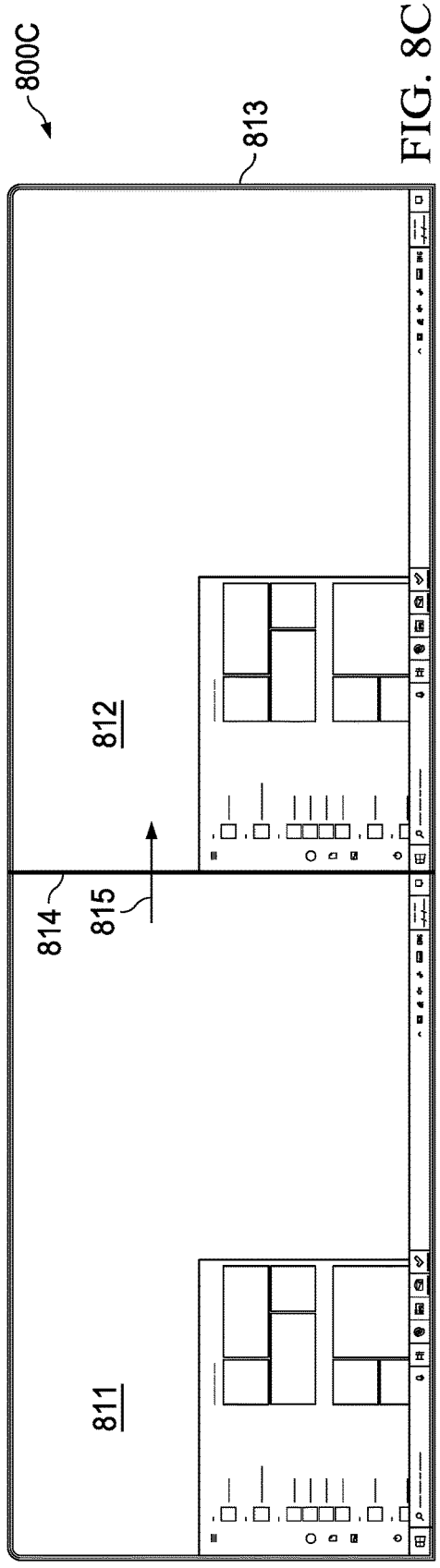

With respect to technique 800C of FIG. 8C, snapping an application to a side of a screen is difficult with a conventionally mouse in a multi-monitor setup, because the pointer or cursor can easily cross the border where monitors 811 and 812 meet. In this case, haptic boundary 813 is responsive to edge actions, whereas haptic bump 814 creates a softer boundary with configurable friction feedback. As such, by rendering area 814 with higher friction, or with force feedback that pushes the pointer cursor away from the border ever so slightly, it becomes easier for a user to lean onto haptic bump 814, and through that snap an application window to the side of screens 811 or 812, or consciously cross the border 815 and drag it to the other monitor.

Figure 8D:
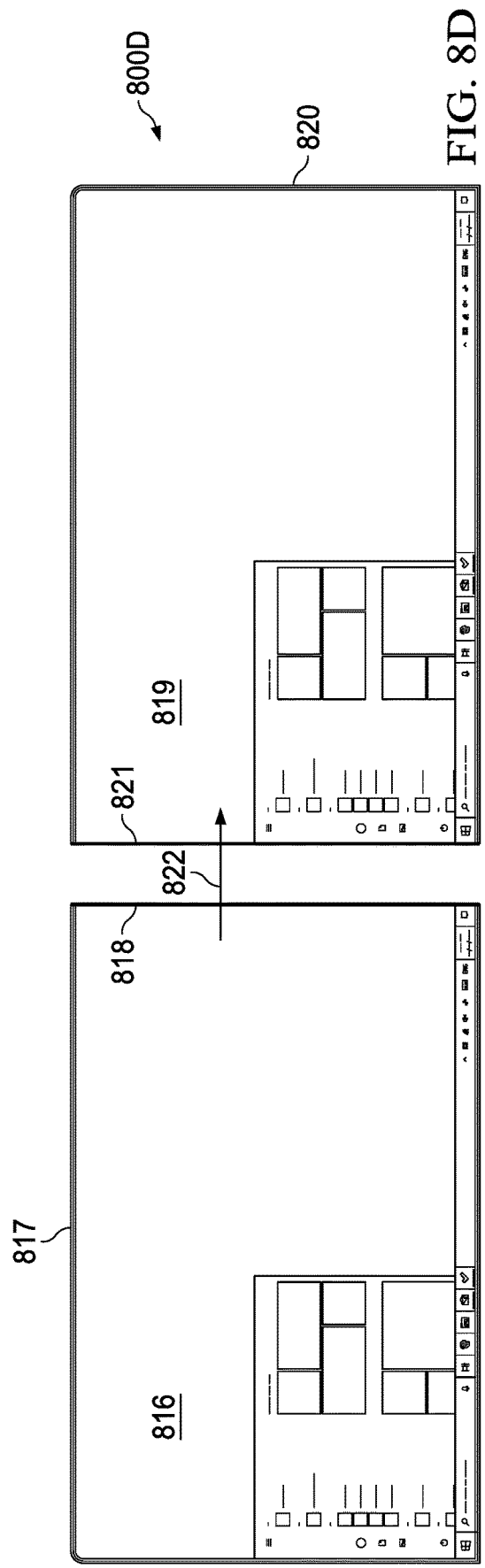

With respect to technique 800D of FIG. 8D, display 816 has haptic boundary 817 and haptic bump 818, and display 819 has haptic boundary 820 and haptic bump 821. Similarly to the multiple monitor setup, two consecutive borders may be rendered. When the same haptic mouse is paired to multiple devices, users can cross the first border 817 (and/or 820) to actuate an edge action. By passing 822 second border 818 (and/or 821), the edge action is canceled, and the mouse switches its connection to the other device (coupled to display 819). Additionally, switching of the haptic mouse to the other device can trigger the switching of other multi-paired devices (e.g., a keyboard), creating a seamless transition from one device to the next.

FIGS. 9A-E are screenshots illustrating techniques for adding physical properties to GUI elements. In various embodiments, haptic cues may tell the user that a GUI element or feature is interactable, and/or how to (or how not to) interact with the GUI element or feature.

Figure 9A:
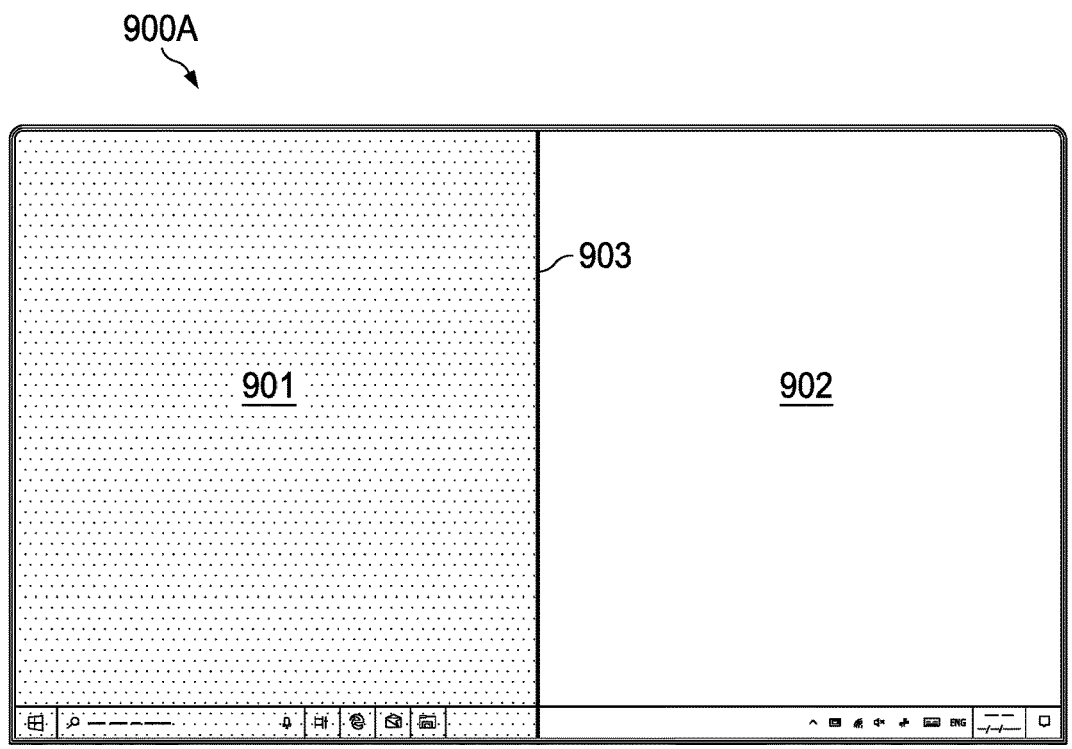

With respect to technique 900A of FIG. 9A, haptic bump 903 between application 901 and application 902 may be used to provide haptic feedback when a user's pointer or cursor crosses it. Additionally, or alternatively, haptic bump 903 may be configured change the friction when the pointer or cursor navigates outside the application that is currently in focus, or in the foreground.

Figure 9B:
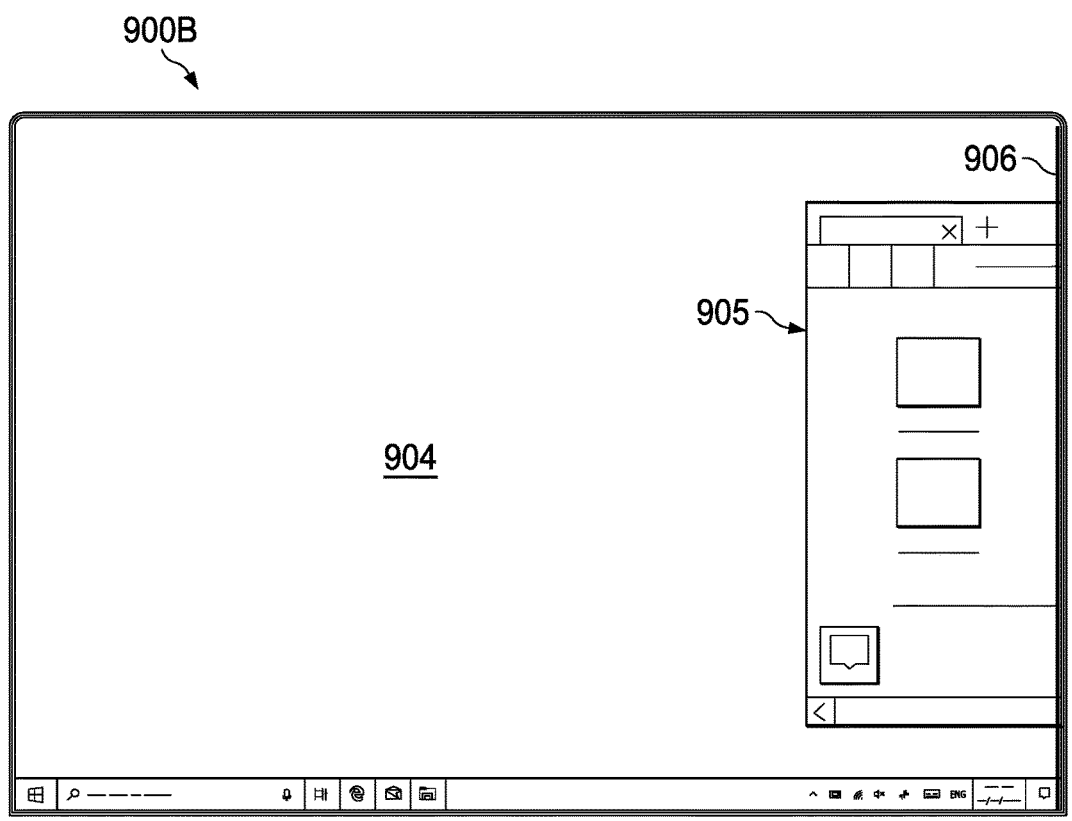

In technique 900B of FIG. 9B, when GUI element 905 comes close to haptic edge 906 of screen 904, the element snaps to the edge. When using vibro-tactile haptics, the haptic response may induce a "click" sensation. With active haptics, the haptic response may include accelerating the mouse to simulate a magnetic attraction.

With respect to technique 900C of FIG. 9C, the haptic response to the pointer or cursor's dragging of GUI feature 909 (e.g., an icon) onto area 908 (e.g., a window) of screen 907 may be such that friction is higher outside of area 908 and smaller within area 908, effectively indicating to the user that area 908 is a target or drop zone for GUI feature 909, so that the user knows when to release the item. This technique is also applicable to scaling, where the user is pulling the handles of a scaling tool or the like.

In technique 900D of FIG. 9D, button 910 may be associated with haptic snapping feature 911 that facilitates hitting button 910 with the pointer or cursor. With respect to technique 900E of FIG. 9E, list or menu 912 may be augmented with haptic edges 913 to aid users in selecting an item from the list.

In other embodiments, systems and methods described herein may be used to add physical properties to digital entities (e.g., files, folders, etc.) rendered on a display using a haptic mouse by setting one or more haptic rules.

For example, physical files and folders have a certain weight, digital files usually do not communicate this to a user. However, the haptic mouse may provide an indication about a file size or confidentiality while dragging it by increasing friction for "heavier" files and folders. For example, the friction applied by the haptic mouse may be larger for files of larger size (e.g., in number of bytes) or for more sensitive files and smaller for files or smaller size or for less sensitive files.

In addition, digital objects may have different material properties. The haptic mouse may be used to create the sensation that is more glass-like or more rubber-like depending upon the confidentiality of a file being dragged.

When using paint brushes in an application, brush settings can change the feel of the haptic mouse. For example, a thinner brush or pen may be associated with smaller friction, whereas a thicker brush or pen may be associated with larger friction. In these applications, different types of virtual canvasses or medium may also be rendered with different vibro-tactile haptics.

In some cases, some GUI elements may snap to a grid. When dragging or scaling such elements, a haptic mouse may be configured to provide users with a feedforward for what would happen upon release, by rendering the attraction to that grid.

Moreover, when dragging a scroll bar, users can go beyond the limits. In some cases, the haptic mouse may be used to provide an elastic effect that indicates to the user that it has gone beyond a limit, and/or that the system will spring back to the closest possible position.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 10:
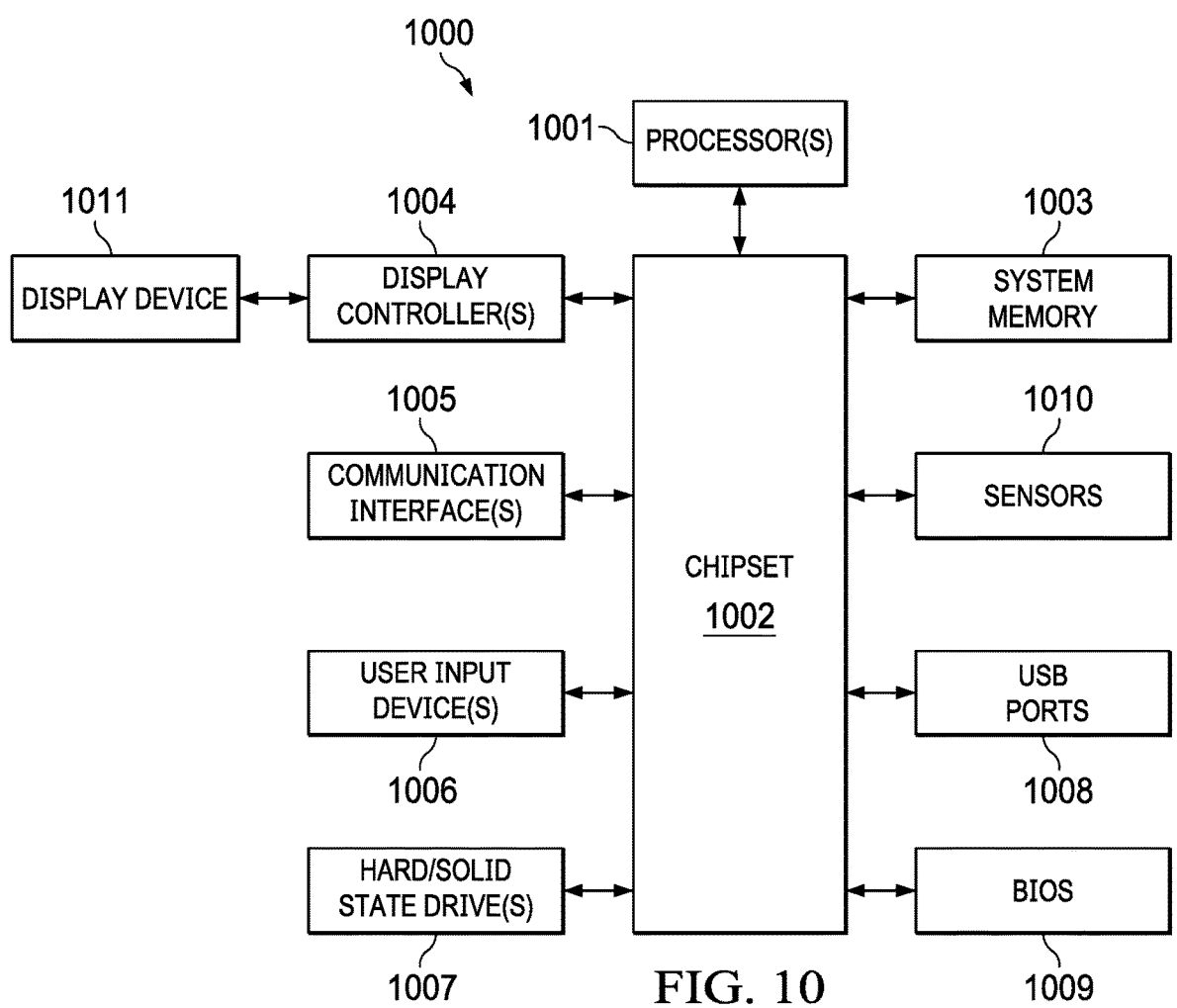
FIG. 10 is a block diagram of an example of internal components of an IHS, according to some embodiments.

FIG. 10 is a block diagram of an example of internal components 1000 of IHS 102, according to some embodiments. As depicted, components 1000 include processor 1001. In various embodiments, IHS 102 may be a single-processor system, or a multi-processor system including two or more processors. Processor(s) 1001 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 102 includes chipset 1002 coupled to processor(s) 1001. In certain embodiments, chipset 1002 may utilize a QuickPath Interconnect (QPI) bus to communicate with processor(s) 1001. In various embodiments, chipset 1002 may provide processor(s) 1001 with access to a number of resources. Moreover, chipset 1002 may be coupled to communication interface(s) 1005 to enable communications with other IHSs and/or peripheral devices via various wired and/or wireless networks, such as Ethernet, WiFi, BLUETOOTH, cellular or mobile networks (e.g., CDMA, TDMA, LTE, etc.), satellite networks, or the like. For example, communication interface(s) 1005 may be coupled to chipset 1002 via a PCIe bus.

Chipset 1002 may be coupled to display controller(s) 1004, which may include one or more or graphics processor(s) (GPUs) on a graphics bus, such as an Accelerated Graphics Port (AGP) or Peripheral Component Interconnect Express (PCIe) bus. As shown, display controller(s) 1004 provide video or display signals to display device 1011.

Display device 1011 may include a flexible display that is deformable (e.g., bent, folded, rolled, or stretched) by an external force applied thereto. For example, display device 1011 may include LCD, OLED, or AMOLED, plasma, electrophoretic, or electrowetting panel(s) or film(s). Moreover, display device 1011 may include a plurality of pixels arranged in a matrix, configured to display visual information, such as text, two-dimensional images, video, three-dimensional images, etc.

Display device 1011 may be configured to sense haptic and/or physical touch events, and to generate touch information. To this end, display device 1011 may include a touchscreen matrix (e.g., a layered capacitive panel or the like) and/or touch controller configured to receive and interpret multi-touch gestures from a user touching the screen with a stylus, or one or more fingers. Generally, display and/or touch control aspects of display device 1011 may be collectively operated and controlled by display controller 1004.

Chipset 1002 may also provide processor 1001 and/or display controller(s) 1004 with access to memory 1003. In various embodiments, system memory 1003 may be implemented using any suitable memory technology, such as static RAM (SRAM), dynamic RAM (DRAM) or magnetic disks, or any nonvolatile/Flash-type memory, such as a solid-state drive (SSD) or the like. Memory 1003 may store program instructions that, upon execution by processor 1001 and/or controller(s) 1004, present a UI interface to a user of IHS 100.

Chipset 1002 may further provide access to one or more hard disk and/or solid-state drives 1007. In certain embodiments, chipset 1002 may also provide access to one or more optical drives or other removable-media drives. In certain embodiments, chipset 1002 may also provide access to one or more Universal Serial Bus (USB) ports 1008.

Upon booting of IHS 102, processor(s) 1001 may utilize Basic Input/Output System (BIOS) 1009 instructions to initialize and test hardware components coupled to IHS 100 and to load an Operating System (OS) for use by IHS 102. BIOS 1009 provides an abstraction layer that allows the OS to interface with certain hardware components that are utilized by IHS 100. Via the hardware abstraction layer provided by BIOS 1009, software stored in memory 1003 and executed by the processor(s) 1001 of IHS 102 is able to interface with certain I/O devices that are coupled to IHS 102. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Chipset 1002 may also provide access to one or more user input devices 1006, for example, using a super I/O controller or the like. For instance, chipset 1002 may provide access to a keyboard, mouse, trackpad, stylus, totem, or any other peripheral input device, including touchscreen display 1011. These input devices may interface with chipset 1002 through wired connections (e.g., in the case of touch inputs received via display controller(s) 1004) or wireless connections (e.g., via communication interfaces(s) 1005). In some cases, chipset 1002 may be used to interface with user input devices such as keypads, biometric scanning devices, and voice or optical recognition devices.

In certain embodiments, chipset 1002 and/or EC 1009 may provide an interface for communications with one or more sensors 1010. Sensors 1010 may provide access to data describing environmental and operating conditions of IHS 102 (e.g., accelerometers, gyroscopes, hinge sensors, rotation sensors, hall effect sensors, lid sensors, temperature sensors, voltage sensors, current sensors, IR sensors, photosensors, proximity sensors, distance sensors, magnetic sensors, microphones, ultrasonic sensors, etc.).

In some cases, processor(s) 1001 may be configured to use context information collected by sensors 1010 to determine the relative orientation and movement of IHS 102. For instance, the sensor hub may utilize inertial movement sensors, that may include accelerometer, gyroscope, and magnetometer sensors, and are capable of determining the current orientation and movement of IHS 102 (e.g., IHS 102 is motionless on a relatively flat surface, IHS 102 is being moved irregularly and is likely in transport, the hinge of IHS 102 is oriented in a vertical direction). In certain embodiments, processor(s) 1001 may also determine a location and movement of IHS 102 based on triangulation of network signal and based on network information provided by the OS or network interface. In some embodiments, processor(s) 1001 may support additional sensors, such as optical, infrared and sonar sensors, that may provide support for xR (virtual, augmented, and/or mixed reality) sessions hosted by IHS 102 and may be used to provide an indication of a user's presence near IHS 102, such as whether a user is present, absent, and/or facing an IHS display.

In cases where an end-user is present before IHS 102, processor(s) 1010 may further determine a distance of the end-user from IHS 102, where this determination may be made continuously, at periodic intervals, or upon request. The detected or calculated distances may be used by processor(s) 1010 to classify the user as being in the IHS's near-field (user's position<threshold distance A), mid-field (threshold distance A<user's position<threshold distance B, where B>A), or far-field (user's position>threshold distance C, where C>B).

In embodiments where IHS 102 may support multiple physical configurations, such as a convertible laptop, N-in-1 device, or the like, processor(s) 1001 may utilize one or more mode sensors 1010 that collect readings that may be used in determining the current posture in which IHS 102 is physically configured. In certain embodiments, such posture determinations may be additionally made using the movement and orientation information provided by sensors 1010.

In laptop and convertible laptop embodiments, for example, processor(s) 1001 may utilize a lid position sensor 1010 to determine the relative angle between the two panels of the laptop in order to determine the mode in which IHS 102 is physically configured. In such embodiments, lid position sensor 1010 may measure the angle of rotation of the hinge that connects the base panel and lid panel of IHS 102. In some cases, processor(s) 1001 may collect lid position information, such as the hinge angle, to then use in determining the posture in which IHS 102 is configured.

Processor(s) 1001 may determine the posture of IHS 102 based, at least in part, on the angle of rotation of the hinge of IHS 102 from a closed position. A first range of hinge angles from a closed position may indicate a laptop posture, a second range of hinge angles may indicate a landscape posture and a third range of angles may indicate a tablet posture. Processor(s) 1001 may additionally utilize orientation and movement information collected from inertial movement sensors 1010 to further determine the posture in which IHS 102 is physically configured.

For instance, if processor(s) 1001 determine that IHS 102 is configured with a hinge angle of a laptop configuration, but IHS 102 is oriented on its side, IHS 102 may be determined to be in a book mode. If IHS 102 is determined to be tilted such that the hinge is oriented between horizontal and vertical, the user's face is detected to be facing the integrated display, and IHS 102 is experiencing slight movement, processor(s) 1001 may determine that IHS 102 is being used in a book posture. Processor(s) 1001 may determine that IHS 102 is opened to a 180-degree hinge angle and lies on a flat surface, thus indicating that IHS 102 it is being used in a landscape posture. Processor(s) 1001 may similarly determine that IHS 102 is in a tent configuration, in response to detecting a hinge angle within a defined range, such as between 300 and 345 degrees, such that the hinge is aligned horizontally and is higher than both display panels of IHS 102.

In some cases, applicable haptics rules or boundaries may be selected based upon context information obtained by sensors 1010. For example, when the user is in the near-field of IHS 102, a first haptic rule or boundary may be selected, when the user is in the mid-field of IHS 102, a second haptic rule or boundary may be selected, and when the user is the far-field of IHS 102, a third haptic rule or boundary may be selected. Depending upon the present posture of IHS 102, the position and/or size of a haptic bump or boundary may be modified.

Moreover, when IHS 102 is with a lid open and/or when a first range of hinge angles is detected, one or more of the aforementioned haptic rules and boundaries may be selected. Conversely, when IHS 102 is with the lid closed and/or when a second range of hinge angles is detected, different ones of the aforementioned haptic rules and boundaries may be selected.

In various embodiments, IHS 102 may not include all of components 1000 shown in FIG. 10. Additionally, or alternatively, IHS 102 may include components in addition to those shown in FIG. 10. Additionally, or alternatively, components represented as discrete in FIG. 10 may be integrated with other components. For example, all or a portion of the functionality provided by the illustrated components may be implemented in a System-On-Chip (SOC), or the like.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having instructions stored thereon that, upon execution by the processor, cause the IHS to:
   detect a behavior of a pointer or cursor traveling in a direction of an edge of a display, wherein the pointer or cursor is controlled by a user via a peripheral device;
   cause the peripheral device to provide a haptic response to the user, wherein the haptic response comprises increasing at least one of: friction, vibration, or force feedback of the peripheral device as the user moves the pointer or cursor towards the edge of the display and decreasing the at least one of: friction, vibration or force feedback of the peripheral device as the user moves the pointer or cursor away from the edge of the display; and
   in response to a determination that the edge of the display is disposed next to another edge of another display, cause the peripheral device to provide a modified haptic response to the user, wherein the modified haptic response comprises: (i) an increase in at least one of: friction, vibration, or force feedback of the peripheral device as the user moves the pointer or cursor towards the edge of the other display, and (ii) a decrease in at least one of: friction, vibration, or force feedback of the peripheral device as the user moves the pointer or cursor away from the edge of the other display.

2. The IHS of claim 1, wherein the peripheral device comprises a mouse.

3. The HIS of claim 1, wherein the instructions, upon execution by the processor, further cause the HIS to:
   in response to a determination that the edge of the display is not disposed next to another edge of another display, display a menu associated with the edge.

4. The HIS of claim 1, wherein the instructions, upon execution by the processor, further cause the HIS to:
   in response to user movement of the pointer or cursor against the edge, render the pointer or cursor on the other display.

5. A memory device having instructions stored thereon that, upon execution by a process of an Information Handling System (IHS), cause the IHS to:
   detect a behavior of a pointer or cursor traveling in a direction of an edge of a display, wherein the pointer or cursor is controlled by a user via a peripheral device;
   cause the peripheral device to provide a haptic response to the user, wherein the haptic response comprises an increase in at least one of: friction, vibration, or force feedback of the peripheral device as the user moves the pointer or cursor towards the edge of the display and a decrease in the at least one of: friction, vibration or force feedback of the peripheral device as the user moves the pointer or cursor away from the edge of the display;
   determine if the edge of the display is disposed next to another edge of another display;
   in response to a determination that the display is disposed next to another edge of another display, render the pointer or cursor on the other display; and
   in response to a determination that the display is not disposed next to another edge of another display, display a menu associated with the edge; and
   cause the peripheral device to provide a modified haptic response to the user, wherein the modified haptic response comprises another increase in at least one of: friction, vibration, or force feedback of the peripheral device as the user moves the pointer or cursor towards the edge of the other display and another decrease in the at least one of: friction, vibration or force feedback of the peripheral device as the user moves the pointer or cursor away from the edge of the other display.

6. A method, comprising:
   detecting, by an Information Handling System (IHS), a behavior of a pointer or cursor traveling in a direction of an edge of a display, wherein the pointer or cursor is controlled by a user via a peripheral device;
   causing the peripheral device to provide a haptic response to the user, at least in part, by: decreasing at least one of: friction, vibration, or force feedback of the peripheral device as the user moves the pointer or cursor towards the edge of the display, and increasing the at least one of: friction, vibration or force feedback of the peripheral device as the user moves the pointer or cursor away from the edge of the display; and
   in response to a determination that the edge of the display is disposed next to another edge of another display, causing the peripheral device to provide a modified haptic response to the user, at least in part, by:
   increasing at least one of: friction, vibration, or force feedback of the peripheral device as the user moves the pointer or cursor towards the edge of the other display; and
   decreasing the at least one of: friction, vibration, or force feedback of the peripheral device as the user moves the pointer or cursor away from the edge of the other display.

7. The IHS of claim 5, wherein the peripheral device comprises a mouse.

8. The method of claim 6, further comprising:
   in response to determining the edge of the display is not disposed next to another edge of another display, displaying a menu associated with the edge.

9. The method of claim 6, further comprising:
   in response to the user moving the pointer or cursor against the edge, rendering the pointer or cursor on the other display.

* * * * *

UNITED STATES PATENT AND TRADEMARK OFFICE
CERTIFICATE OF CORRECTION

PATENT NO. : 11,226,690 B2  
APPLICATION NO. : 16/846038  
DATED : January 18, 2022  
INVENTOR(S) : Knoppert et al.

Page 1 of 1

It is certified that error appears in the above-identified patent and that said Letters Patent is hereby corrected as shown below:

In the Claims

In Column 13, Line 47, Claim 3, delete "HIS" and insert -- IHS -- therefor.

In Column 13, Line 48, Claim 3, delete "HIS" and insert -- IHS -- therefor.

In Column 13, Line 52, Claim 4, delete "HIS" and insert -- IHS -- therefor.

In Column 13, Line 53, Claim 4, delete "HIS" and insert -- IHS -- therefor.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*